United States Patent
Galloway et al.

(10) Patent No.: US 8,316,181 B2
(45) Date of Patent: *Nov. 20, 2012

(54) METHOD AND SYSTEM FOR INITIALIZING STORAGE IN A STORAGE SYSTEM

(75) Inventors: William C. Galloway, Magnolia, TX (US); Ryan A. Callison, Magnolia, TX (US); Greg J. Pellegrino, Tomball, TX (US); Choon-Seng Tan, Houston, TX (US); George J. Scholhamer, III, Tomball, TX (US)

(73) Assignee: Pivot3, Inc., Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/366,069

(22) Filed: Feb. 3, 2012

(65) Prior Publication Data

US 2012/0137069 A1 May 31, 2012

Related U.S. Application Data

(63) Continuation of application No. 12/479,377, filed on Jun. 5, 2009, now Pat. No. 8,145,841.

(60) Provisional application No. 61/131,270, filed on Jun. 6, 2008, provisional application No. 61/131,314, filed on Jun. 6, 2008, provisional application No. 61/131,291, filed on Jun. 6, 2008, provisional application No. 61/131,290, filed on Jun. 6, 2008, provisional application No. 61/131,379, filed on Jun. 6, 2008, provisional application No. 61/131,312, filed on Jun. 6, 2008.

(51) Int. Cl.
*G06F 12/00* (2006.01)

(52) U.S. Cl. .................. 711/114; 711/162; 711/170

(58) Field of Classification Search .................. None
See application file for complete search history.

(56) References Cited

U.S. PATENT DOCUMENTS

| | | | |
|---|---|---|---|
| 6,304,942 | B1 | 10/2001 | Dekoning et al. |
| 6,895,485 | B1 | 5/2005 | Dekoning et al. |
| 7,032,086 | B2 | 4/2006 | Merchant |
| 7,096,316 | B1 | 8/2006 | Karr et al. |
| 7,130,960 | B1 | 10/2006 | Kano |
| 7,366,837 | B2 | 4/2008 | Corbett et al. |
| 7,389,393 | B1 | 6/2008 | Karr et al. |
| 8,082,393 | B2 | 12/2011 | Galloway |
| 8,086,797 | B2 | 12/2011 | Galloway |
| 8,090,909 | B2 | 1/2012 | Galloway |
| 8,127,076 | B2 | 2/2012 | Galloway |

(Continued)

OTHER PUBLICATIONS

International Search Report and Written Opinion issued for PCT/US2009/046470, mailed on Jul. 21, 2009, 9 pgs.

(Continued)

*Primary Examiner* — Shawn X Gu
(74) *Attorney, Agent, or Firm* — Sprinkle IP Law Group

(57) ABSTRACT

Embodiments of systems and methods for a storage system are disclosed. More particularly, in certain embodiments desired locations of storage devices may be zeroed out during operation of the storage system and areas that have been zeroed out allocated to store data when commands pertaining to that data are received. Specifically, in one embodiment a distributed RAID system comprising a set of data banks may be provided where each data bank in the set of data banks may execute a background process which zeroes areas of the storage devices of the data bank. When a command pertaining to a logical location is received a zeroed area of the physical storage devices on the data bank may be allocated to store data associated with that logical location.

21 Claims, 7 Drawing Sheets

U.S. PATENT DOCUMENTS

| | | | |
|---|---|---|---|
| 8,140,753 | B2 | 3/2012 | Galloway et al. |
| 8,145,841 | B2 | 3/2012 | Galloway |
| 8,176,247 | B2 | 5/2012 | Galloway et al. |
| 8,219,750 | B2 | 7/2012 | Galloway et al. |
| 8,239,624 | B2 | 8/2012 | Galloway et al. |
| 8,255,625 | B2 | 8/2012 | Galloway et al. |
| 8,261,017 | B2 | 9/2012 | Galloway et al. |
| 8,271,727 | B2 | 9/2012 | Galloway et al. |
| 2002/0035667 | A1 | 3/2002 | Bruning, III et al. |
| 2002/0069317 | A1 | 6/2002 | Chow et al. |
| 2002/0069318 | A1 | 6/2002 | Chow et al. |
| 2002/0087751 | A1 | 7/2002 | Chong, Jr. |
| 2003/0135709 | A1 | 7/2003 | Niles et al. |
| 2003/0159001 | A1 | 8/2003 | Chalmer et al. |
| 2004/0003173 | A1 | 1/2004 | Yao et al. |
| 2004/0153479 | A1 | 8/2004 | Mikesell et al. |
| 2004/0168018 | A1 | 8/2004 | Aasheim et al. |
| 2004/0177218 | A1 | 9/2004 | Meehan et al. |
| 2004/0221070 | A1 | 11/2004 | Ortega, III et al. |
| 2005/0015700 | A1 | 1/2005 | Hetzler et al. |
| 2005/0114350 | A1 | 5/2005 | Rose et al. |
| 2006/0010227 | A1 | 1/2006 | Atluri |
| 2006/0129559 | A1 | 6/2006 | Sankaran et al. |
| 2006/0242377 | A1 | 10/2006 | Kanie et al. |
| 2006/0248273 | A1 | 11/2006 | Jernigan, IV et al. |
| 2006/0248379 | A1 | 11/2006 | Jernigan, IV |
| 2006/0271734 | A1 | 11/2006 | Strange et al. |
| 2006/0277383 | A1 | 12/2006 | Hayden et al. |
| 2007/0073990 | A1 | 3/2007 | Snaman et al. |
| 2007/0094348 | A1 | 4/2007 | Scheidel et al. |
| 2007/0143541 | A1 | 6/2007 | Nichols et al. |
| 2007/0271434 | A1 | 11/2007 | Kawamura et al. |
| 2008/0104443 | A1 | 5/2008 | Akutsu et al. |
| 2008/0109601 | A1 | 5/2008 | Klemm et al. |
| 2008/0155191 | A1 | 6/2008 | Anderson et al. |
| 2008/0222633 | A1 | 9/2008 | Kami |
| 2008/0256292 | A1 | 10/2008 | Flynn et al. |
| 2008/0270680 | A1 | 10/2008 | Chang |
| 2009/0006746 | A1 | 1/2009 | Sharma et al. |
| 2009/0172335 | A1 | 7/2009 | Kulkarni et al. |
| 2010/0106906 | A1 | 4/2010 | Galloway et al. |
| 2011/0022801 | A1 | 1/2011 | Flynn |
| 2012/0054431 | A1 | 3/2012 | Galloway et al. |
| 2012/0054432 | A1 | 3/2012 | Galloway et al. |
| 2012/0054433 | A1 | 3/2012 | Galloway et al. |
| 2012/0124286 | A1 | 5/2012 | Galloway et al. |
| 2012/0131383 | A1 | 5/2012 | Galloway et al. |

OTHER PUBLICATIONS

International Search Report and Written Opinion issued for PCT/US2009/046473 mailed on Jul. 14, 2009, 8 pgs.
International Search Report and Written Opinion issued for PCT/US2009/048570 mailed on Aug. 5, 2009, 9 pgs.
International Search Report and Written Opinion issued for PCT/US2009/048574 mailed on Aug. 20, 2009, 10 pgs.
International Search Report and Written Opinion issued for PCT/US2009/046471 mailed on Dec. 28, 2009, 9 pgs.
International Preliminary Report on Patentability issued for PCT Patent Application No. PCT/US2009/046470, mailed on Dec. 16, 2010, issued on Dec. 6, 2010, 8 pgs.
International Preliminary Report on Patentability issued for PCT Patent Application No. PCT/US2009/046471, mailed on Dec. 16, 2010, issued on Dec. 6, 2010, 8 pgs.
International Preliminary Report on Patentability issued for PCT Patent Application No. PCT/US2009/046473, mailed on Dec. 16, 2010, issued on Dec. 6, 2010, 7 pgs.
International Preliminary Report on Patentability issued for PCT Patent Application No. PCT/US2009/048570, mailed on Jan. 13, 2011, issued on Jan. 5, 2011, 8 pgs.
Office Action issued for U.S. Appl. No. 12/479,434, mailed May 11, 2011, 13 pgs.
International Preliminary Report on Patentability for PCT Patent Application No. PCT/US2009/048574, mailed May 12, 2011, 9 pgs.
Office Action issued for U.S. Appl. No. 12/479,360, mailed Jun. 7, 2011, 17 pgs.
Office Action issued for U.S. Appl. No. 12/479,319, mailed Jun. 22, 2011, 18 pgs.
Office Action issued for U.S. Appl. No. 12/479,403, mailed Jun. 24, 2011, 13 pgs.
Office Action issued for U.S. Appl. No. 12/479,377, mailed Jul. 29, 2011, 14 pgs.
Notice of Allowance issued in U.S. Appl. No. 12/479,434, mailed Sep. 21, 2011, 9 pgs.
Notice of Allowance issued in U.S. Appl. No. 12/479,403, mailed Sep. 30, 2011, 14 pgs.
Notice of Allowance issued in U.S. Appl. No. 12/479,319, mailed Oct. 5, 2011, 14 pgs.
Notice of Allowance issued in U.S. Appl. No. 12/479,394, mailed Oct. 5, 2011, 8 pgs.
Office Action issued in U.S. Appl. No. 13/224,936, mailed Oct. 12, 2011, 8 pgs.
Office Action issued in U.S. Appl. No. 12/490,810, mailed Oct. 18, 2011, 21 pgs.
Office Action issued in U.S. Appl. No. 12/479,360, mailed Oct. 25, 2011, 25 pgs.
John H. Hartman et al., "The Zebra Striped Network File System," ACM Transactions on Computer Systems, vol. 13, No. 3, Aug. 1995, pp. 274-310.
Notice of Allowance issued in U.S. Appl. No. 12/479,377, mailed Nov. 18, 2011, 8 pgs.
Notice of Allowance issued for U.S. Appl. No. 13/224,936, mailed Dec. 14, 2011, 9 pgs.
Notice of Allowance for U.S. Appl. No. 12/490,916, mailed Jan. 9, 2012, 5 pgs.
Office Action issued in U.S. Appl. No. 13/292,388, mailed Jan. 20, 2012, 6 pages.
Office Action issued for U.S. Appl. No. 13/291,311 mailed Feb. 1, 2012, 12 pages.
Office Action issued for U.S. Appl. No. 12/479,360 mailed Feb. 6, 2012, 8 pages.
Notice of Allowance issued for U.S. Appl. No. 12/490,810, mailed Feb. 16, 2012, 8 pages.
Office Action issued for U.S. Appl. No. 13/291,309, mailed Feb. 24, 2012, 10 pages.
Supplemental Notice of Allowance issued for U.S. Appl. No. 13/291,309, mailed May 22, 2012, 5 pages.
Corrected Notice of Allowance issued for U.S. Appl. No. 13/291,311, mailed May 22, 2012, 5 pages.
Office Action issued for U.S. Appl. No. 13/364,439, mailed May 25, 2012, 21 pages.
Notice of Allowance issued for U.S. Appl. No. 12/479,360, mailed Apr. 2, 2012, 4 pages.
Office Action issued for U.S. Appl. No. 13/358,306, mailed Apr. 4, 2012, 21 pages.
Supplemental Notice of Allowance for U.S. Appl. No. 12/490,916, mailed Apr. 9, 2012, 4 pages.
Notice of Allowance issued for U.S. Appl. No. 13/291,309, mailed Apr. 12, 2012, 5 pages.
Notice of Allowance issued for U.S. Appl. No. 13/291,311, mailed Apr. 13, 2012, 5 pages.
Corrected Notice of Allowance issued for U.S. Appl. No. 13/291,311, mailed Jun. 21, 2012, 5 pages.
Supplemental Notice of Allowance issued for U.S. Appl. No. 13/291,309, mailed Jun. 22, 2012, 5 pages.
Office Action issued for U.S. Appl. No. 12/914,559, mailed Jun. 25, 2012, 15 pages.
International Search Report and Written Opinion issued for PCT Application No. PCT/US2012/034701, mailed on Jul. 3, 2012, 12 pages.
European Search Report issued for European Patent Application No. 09 759 544.1, mailed on Apr. 5, 2012, 12 pages.
Supplemental Notice of Allowance issued for U.S. Appl. No. 13/291,309, mailed Aug. 2, 2012, 5 pages.
Notice of Allowance issued for U.S. Appl. No. 13/358,306, mailed Aug. 24, 2012, 3 pages.

| TABLE 550 | | | |
|---|---|---|---|
| | 4 BYTES | LV NUMBER | 504 |
| | 4 BYTES | SEGMENT SIZE | 508 |
| | 8 BYTES | SEGMENT COUNT | 512 |
| | 4 BYTES | QUALITY OF SERVICE | 514 |
| | 4 BYTES | RANGE COUNT | 518 |
| 524a INFORMATION FOR RANGE | 4 BYTES | TYPE | 526a |
| | 8 BYTES | START | 530a |
| | 8 BYTES | END | 534a |
| | 2 BYTES | NETWORK RAID | 538a |
| | 2 BYTES | NETWORK RAID SIZE | 542a |
| | 2 BYTES | DISK RAID | 546a |
| | 2 BYTES | DISK RAID SIZE | 552a |
| | 4 BYTES | DATA BANK COUNT | 554a |
| | 4 BYTES | DATA BANK ORDER | 558a |
| | 4 BYTES | DISK COUNT | 562a |
| | 4 BYTES | DISK ORDER | 566a |
| | | ⋮ | |
| | 4 BYTES | DISK COUNT | 562an |
| | 4 BYTES | DISK ORDER | 566an |
| 524b INFORMATION FOR RANGE | 4 BYTES | TYPE | 526b |
| | 8 BYTES | START | 530b |
| | 8 BYTES | END | 534b |
| | 2 BYTES | NETWORK RAID | 538b |
| | 2 BYTES | NETWORK RAID SIZE | 542b |
| | 2 BYTES | DISK RAID | 546b |
| | 2 BYTES | DISK RAID SIZE | 552b |
| | 4 BYTES | DATA BANK COUNT | 554b |
| | 4 BYTES | DATA BANK ORDER | 558b |
| | 4 BYTES | DISK COUNT | 562b |
| | 4 BYTES | DISK ORDER | 566b |
| | | ⋮ | |
| | 4 BYTES | DISK COUNT | 562bn |
| | 4 BYTES | DISK ORDER | 566bn |
| | ADDITIONAL RANGE ENTRIES | | 524n |

*FIG. 5*

| DISK TABLE 670 | | | |
|---|---|---|---|
| PHYSICAL SEGMENT 1 | LV NUMBER | LOGICAL SEGMENT NUMBER | ADDRESS SPACE | SECTOR STATE |
| PHYSICAL SEGMENT 2 | LV NUMBER | LOGICAL SEGMENT NUMBER | ADDRESS SPACE | SECTOR STATE |
| PHYSICAL SEGMENT 3 | LV NUMBER | LOGICAL SEGMENT NUMBER | ADDRESS SPACE | SECTOR STATE |
| PHYSICAL SEGMENT 4 | LV NUMBER | LOGICAL SEGMENT NUMBER | ADDRESS SPACE | SECTOR STATE |
| PHYSICAL SEGMENT 5 | LV NUMBER | LOGICAL SEGMENT NUMBER | ADDRESS SPACE | SECTOR STATE |
| PHYSICAL SEGMENT 6 | LV NUMBER | LOGICAL SEGMENT NUMBER | ADDRESS SPACE | SECTOR STATE |
| ... | ... | ... | ... | ... |
| PHYSICAL SEGMENT (n) | LV NUMBER | LOGICAL SEGMENT NUMBER | ADDRESS SPACE | SECTOR STATE |
| PHYSICAL SEGMENT (n+1) | LV NUMBER | LOGICAL SEGMENT NUMBER | ADDRESS SPACE | SECTOR STATE |

*FIG. 7*

METHOD AND SYSTEM FOR INITIALIZING STORAGE IN A STORAGE SYSTEM

RELATED APPLICATIONS

This application is a continuation, and claims a benefit of priority under 35 U.S.C. 120 of the filing date of U.S. patent application Ser. No. 12/479,377 filed Jun. 5, 2009, now granted as U.S. Pat. No. 8,145,841 issued on Mar. 27, 2012, which claims a benefit of priority under 35 U.S.C. §119 to provisional patent application Nos. 61/131,270 by inventors Galloway et al., entitled "Method and System for Distributed RAID Implementation" filed on Jun. 6, 2008; and 61/131,314 by inventors Galloway et al., entitled "Method and System for Data Migration in a Distributed Multi-Processor RAID Subsystem" filed Jun. 6, 2008; and 61/131,291 by inventors alloway et al., entitled "System and Method for Distributing Read/Write Requests to Optimal SCSI Targets" filed Jun. 6, 2008; and 61/131,290 by inventors Galloway et al., entitled "Method and System for Utilizing Storage in a Storage System" filed Jun. 6, 2008; and 61/131,379 by inventors Galloway et al., entitled "Method and System for Rebuilding Data" filed Jun. 6, 2008; and 61/131,312 by inventors Galloway et al., entitled "Method and System for Placement of Data on Storage" filed Jun. 6, 2008; the entire contents of each are hereby fully incorporated by reference herein for all purposes.

TECHNICAL FIELD

This invention relates generally to the use of storage devices. More particularly, embodiments of this invention relate to the initialization of storage in a storage system.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business, legal or other purposes, many entities may desire to protect their data using a variety of techniques, including data storage, redundancy, security, etc. These techniques may, however, conflict with other competing constraints or demands imposed by the state or configuration of computing devices used to process or store this data.

One method for dealing with these tensions is to implement a Redundant Array of Independent Disks (RAID). Generally, RAID systems divide and replicate data across multiple hard disk drives (or other types of storage media), collectively referred to as an array, to increase reliability and in some cases improve throughput of computing devices (known as a host) using these RAID systems for storage. To a host then, a RAID array may appear as one or more monolithic storage areas. When a host desires to communicate (read, write, etc.) with the RAID system the host communicates as if the RAID array were a single disk. The RAID system, in turn, processes these communications to implement a certain RAID level in conjunction with such communications. These RAID levels may be designed to achieve some desired balance between a variety of tradeoffs such as reliability, capacity, speed, etc. For example, RAID (level) 0 distributes data across several disks in a way which gives improved speed and utilizes substantially the full capacity of the disks, but all data on a disk will be lost if the disk fails; RAID (level) 1 uses two (or more) disks which each store the same data, so that data is not lost so long as one disk survives. Total capacity of the array is substantially the capacity of a single disk and RAID (level) 5 combines three or more disks in a way that protects data against loss of any one disk; the storage capacity of the array is reduced by one disk.

Current implementations of RAID may have a variety of problems. These problems may stem from limitations imposed by the architecture of these RAID systems, such as the fact that in many instances all communications with a RAID system must be addressed to a single server which controls and manages the RAID system. Other problems may arise from the configuration or layout of the data on the disks comprising a RAID system. For example, in certain cases a RAID level must be chosen and storage allocated within the RAID system before the RAID system can be utilized. Thus, the initially chosen RAID level must be implemented in conjunction with the data stored on the RAID system, irrespective of whether that level of RAID is desired or needed. In many cases these existing problems may be exacerbated by the need to use custom hardware or software to implement these solutions, raising the costs associated with implementing such a solution.

Additionally, in RAID systems or other storage systems which present storage to a host or other device multiple issues may delay the utilization of the storage system or particular storage devices within the storage system. More specifically, setting up such a storage system may require mirroring data on storage devices or the calculation of parities or other redundancy data before the storage system may be used by one or more hosts. This is the result of the fact that individual sectors in a disk which has not yet been initialized or which is being reused or overwritten may contain random bits or other data affecting the calculation of redundancy data. Thus, it may be necessary to run operations based on data in the individual sectors comprising the disks or other storage devices before they may be utilized to store data. This is especially true for storage systems such as RAID systems or other systems which mirror data on storage devices or calculate redundancy data based on the data in the sectors of the storage device(s).

In RAID systems for example, until redundancy data corresponding to the data stored on the storage devices comprising the RAID system is calculated it may not be possible to rebuild or recreate stored data in the event of a failure. Thus, even before utilizing a storage device for the storage of data, in order to be able to recreate any stored data that is subsequently stored, the redundancy data corresponding to the current value in the storage devices may need to be calculated and stored, even though the values in those storage devices may be garbage values.

This is problematic, as calculating redundancy data when setting up storage systems may be a lengthy process. In general, the total number of sectors on storage devices comprising a storage system may be large and a great deal of time may be required to mirror the data or calculate parity or other redundancy data. In some storage systems, such calculations based on the data at sectors in the storage devices may take upwards of many hours, increasing the time required to set up operational storage systems and inconveniencing users of such systems.

Consequently, it is desired to substantially ameliorate these problems.

SUMMARY

Embodiments of systems and methods for a high availability storage system are disclosed. More particularly, in certain embodiments desired locations of storage devices may be zeroed out during operation of the storage system and areas that have been zeroed out allocated to store data when commands pertaining to that data are received. Specifically, in one embodiment a distributed RAID system comprising a set of data banks may be provided where each data bank in the set of data banks may execute a background process which zeroes areas of the storage devices of the data bank. When a command pertaining to a logical location is received a zeroed area of the physical storage devices on the data bank may be allocated to store data associated with that logical location.

Aspects and embodiments of the invention may provide certain advantages. In particular, by reducing or eliminating the need to write zeros or otherwise format or initialize storage devices added to a storage system before use, the time required to integrate and use a storage device in a storage system may be reduced. Faster use of added storage devices may enhance the overall reliability of the storage system. Furthermore, by assigning virtual zeros to dirty sectors and presenting the virtual zeros to one or more hosts or users may prevent hosts or users from accessing private information or data which may be leftover on dirty sectors in newly added storage.

Similarly, when redistributing storage among volumes presented to hosts by storage systems, sectors previously allocated to a volume may be a part of a different volume presented to one or more different hosts. In a table with entries corresponding to the individual sectors on physical storage devices, when sectors are allocated to different volumes, the entry may be written to indicate that the sector is a dirty sector and a virtual zero may be associated with that sector such that a host or other device attempting to access that sector will receive the virtual zero. Thus, data at previously allocated sectors may be protected from unauthorized access by associating a virtual zero with the sector and presenting the virtual zero when a host or other device attempts to access the sector.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 5 is a block diagram of one embodiment of a table.

FIG. 7 is a block diagram of one embodiment of a table.

DETAILED DESCRIPTION

Figure 1:
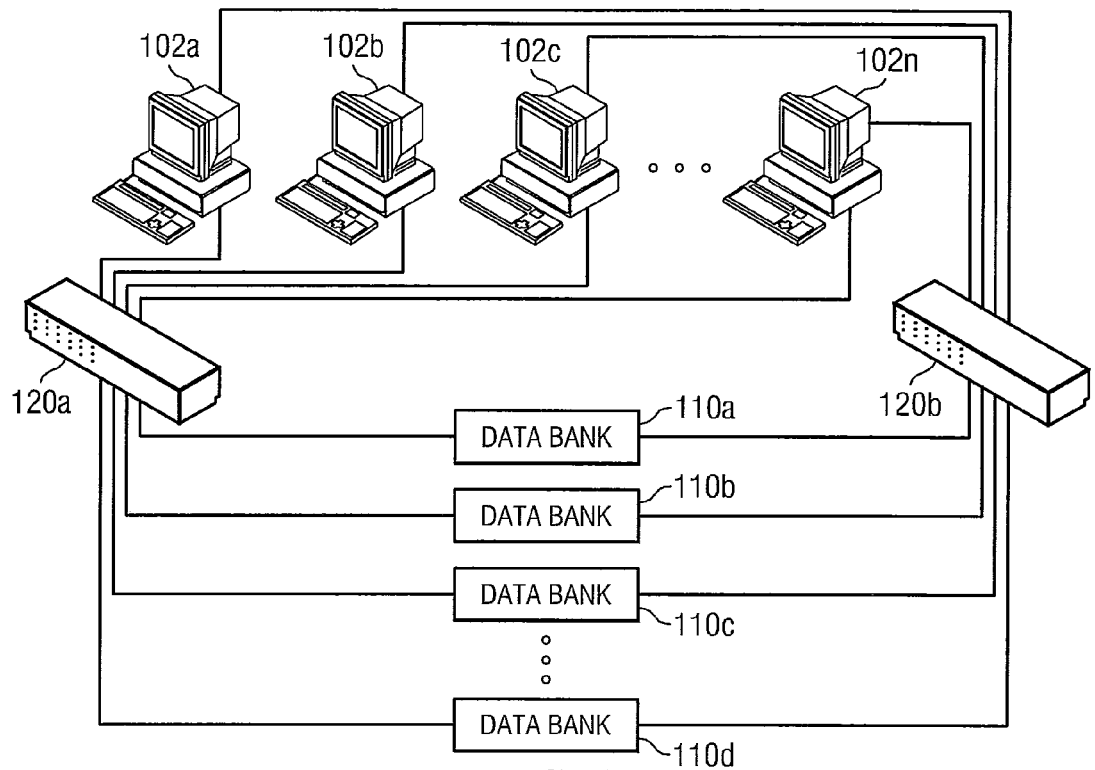
FIG. 1 is a block diagram of one embodiment of an architecture employing a distributed RAID system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples illustrations includes, but is not limited to: "for example", "for instance", "e.g.", "in one embodiment".

This application is related to U.S. patent application Ser. Nos. 12/479,319 entitled "Method and System for Distributed RAID Implementation" by Galloway et al., filed on Jun. 5, 2009; 12/479,360 entitled "Method and System for Data Migration in a Distributed RAID Implementation" by Galloway et al., filed on Jun. 5, 2009; 12/479,403, entitled "Method and System for Distributing Commands to Targets" by Galloway et al., filed Jun. 5, 2009; 12/479,434, entitled "Method and System for Rebuilding Data in a Distributed RAID System" by Galloway et al., filed Jun. 5, 2009; and 12/479,394, entitled "Method and System for Placement of Data on a Storage Device" by Galloway et al., filed Jun. 5, 2009 all of which are incorporated fully herein by reference.

A brief discussion of context may now be helpful. As discussed above, RAID systems divide and replicate data across multiple hard disk drives (or other types of storage media), collectively referred to as an array, to increase reliability and in some cases improve throughput of computing devices (known as a host) using these RAID systems for storage. However, current implementations of RAID may have a variety of problems.

In particular, in RAID systems, until redundancy data corresponding to the data stored on the storage devices comprising the RAID system is calculated it may not be possible to rebuild or recreate stored data in the event of a failure. Thus, even before utilizing a storage device for the storage of data, in order to be able to recreate any stored data that is subsequently stored, the redundancy data corresponding to the current value in the storage devices may need to be calculated and stored, even though the values in those storage devices may be garbage values. This is problematic, as calculating redundancy data when setting up storage systems may be a lengthy process. It is desired to substantially ameliorate this problem, among others.

To that end, attention is now directed to the systems and methods of the present invention. Embodiments of these systems and methods provide a high availability RAID system where the RAID system, disks added to the RAID system, freed volumes and in general, storage devices, may be made more quickly available for use with relatively less system down time. More particularly, in certain embodiments desired locations of storage devices may be zeroed out during operation of the RAID system and areas that have been zeroed out allocated to store data when commands pertaining to that data are received.

Specifically, in one embodiment a distributed RAID system comprising a set of data banks may be provided where each data bank in the set of data banks may execute a background process which zeroes areas of the storage devices of the data bank. When a command pertaining to a logical location is received a zeroed area of the physical storage devices on the data bank may be allocated to store data associated with that logical location. By zeroing the areas of storage device in the background a number of advantages may be achieved, including lessening the time in which a storage system may be unavailable for formatting, initialization or allocation purposes.

It will be helpful to illustrate certain embodiments of the present invention with respect to a particular RAID system, it should be noted however, that the particular RAID system with which certain embodiments are illustrated places no limitations on the applicability or use of other embodiments of the invention, and that such embodiments may be usefully employed in any of a variety of contexts, including other types of RAID systems or other types of storage systems altogether.

With that being said, certain embodiments may be usefully illustrated with respect to a distributed RAID system, where a volume with an associated RAID level may be created using the distributed RAID system. Each of the distributed RAID applications can then coordinate operations associated with data of that volume such that data associated with that volume or the implementation of the desired RAID level in conjunction with that volume may be stored on the multiple data banks of the distributed RAID system. By coordinating the implementation of a level of RAID in conjunction with a volume by storing both data of the volume and data associated with the implementation of RAID on multiple data banks using similar distributed RAID applications executing on each of those data banks a number of advantages may be achieved. Namely, different storage volumes may be allotted, with one or more of the volumes implemented in conjunction with different RAID levels. Moreover, as the coordination of storage and the implementation of RAID across the data banks is accomplished using substantially identical distributed RAID applications, in many cases standard or off-the-shelf hardware, such as standard x86 based servers and storage media may be utilized. Many other advantages may also be realized utilizing embodiments presented herein or other embodiments, and such advantages, which may or may not be pointed out in particular detail, will be realized after reading this disclosure.

Turning now to FIG. 1, a block diagram of an architecture for a system which utilizes one embodiment of a distributed RAID system is depicted. Distributed RAID system 100 includes a set of data banks 110, each data bank 110 communicatively coupled to both of switches 120. Each of switches 120 is also communicatively coupled to each host 102, such that a host 102 may communicate with each data bank 110 through a set of paths corresponding to a particular data bank 110, each path comprising one of the switches 120.

The communicative coupling between data banks 110, switches 120 and hosts 102 may be accomplished using almost any transport medium (either wired or wireless)

desired, including Ethernet, SCSI, iSCSI, Fibre Channel, serial attached SCSI ("SAS"), advanced technology attachment ("ATA"), serial ATA ("SATA") or other protocols known in the art. Furthermore, the communicative coupling may be implemented in conjunction with a communications network such as the Internet, a LAN, a WAN, a wireless network or any other communications network known in the art.

In one embodiment, then, using a commands protocol, such as iSCSI, SCSI, etc., hosts 102 may communicate with data banks 110 to manipulate data. More particularly, each of data banks 110 comprises storage media (as will be explained in more detail later on herein). Collectively, the storage media in data banks 110 may be virtualized and presented to hosts 102 as one or more contiguous blocks of storage, storage devices, etc. For example, when the iSCSI protocol is utilized the storage media in data banks 110 may be presented to hosts 102 as a SCSI target with, in one embodiment, multiple ports.

Thus, during operation, in one embodiment a host 102 (or a user at a host 102 or interfacing with data bank 110) may request the creation of a volume and specify a level of RAID to be implemented in conjunction with that volume. Data associated with that volume and the implementation of the desired level RAID in association with that volume is stored across data banks 110. The hosts 102 may then access this volume using logical address corresponding to the volume or a portion thereof. In this manner, hosts 102 can utilize created volumes of storage and fault tolerance can be achieved in conjunction with these volumes substantially invisibly to hosts 102.

Figure 2A:
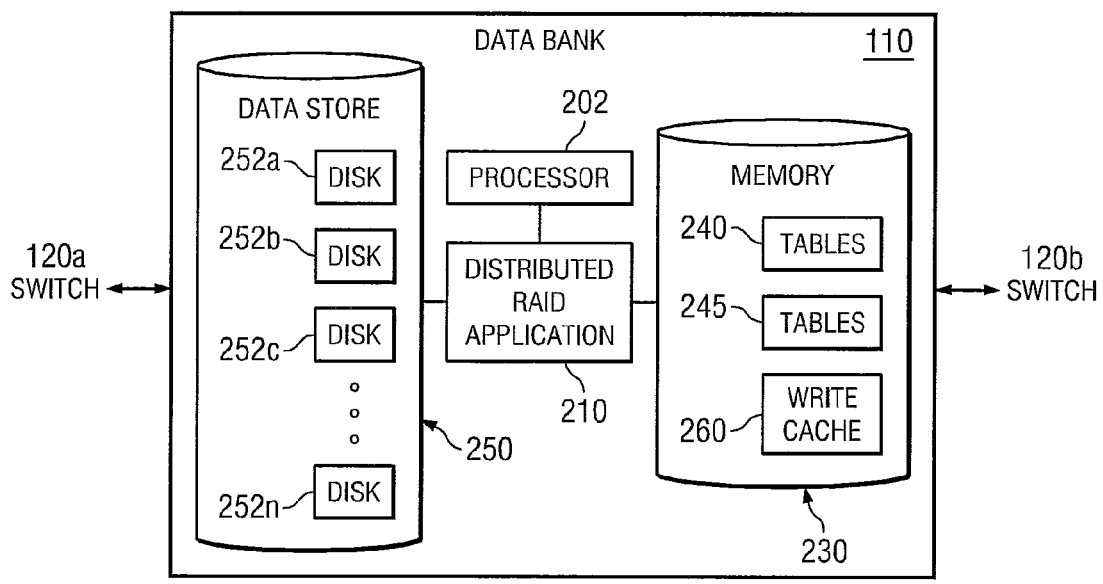
FIG. 2A is a block diagram of one embodiment of a data bank.

The virtualization of storage and the implementation of RAID utilizing data banks 110 may be better understood with reference to FIG. 2A which depicts a block diagram of one embodiment of a data bank 110 computer operable to implement distributed RAID. Here, data bank 110 comprises a data store 250, and a processor 202 operable to execute instructions stored on a computer readable medium, where the instructions are operable to implement distributed RAID application 210. Distributed RAID application 210 may periodically issue heartbeat communications to distributed RAID applications 210 on other data banks 110 to determine if there has been a fault with respect to that data bank 110. If the distributed RAID application 210 determines that another data bank 110 is experiencing a fault it may set one or more fault flags corresponding to that data bank 110. Using these fault flags for each distributed RAID application 210 on each data bank 110 a particular distributed RAID application 210 may determine if a certain data bank 110 is faulty.

Distributed RAID application 210 may also have access (for example, to read, write, issue commands, etc.) to data store 250 comprising one or more storage media, which may for example be disks 252 operating according to almost any protocol known, such as SATA, PATA, FC, etc. where each of the disks 252 may, or may not, be of equal size. Distributed RAID application 210, executing on each of data banks 110 can allow the allocation of and use of volumes using data stores 250 across data banks 110 and the implementation of RAID in conjunction with these volumes utilizing a set of global tables 240 shared between data banks 110, a set of local tables 245 and write cache 260, all of which may be stored in a memory 230 (which may be data store 250 or another memory altogether).

Figure 2B:
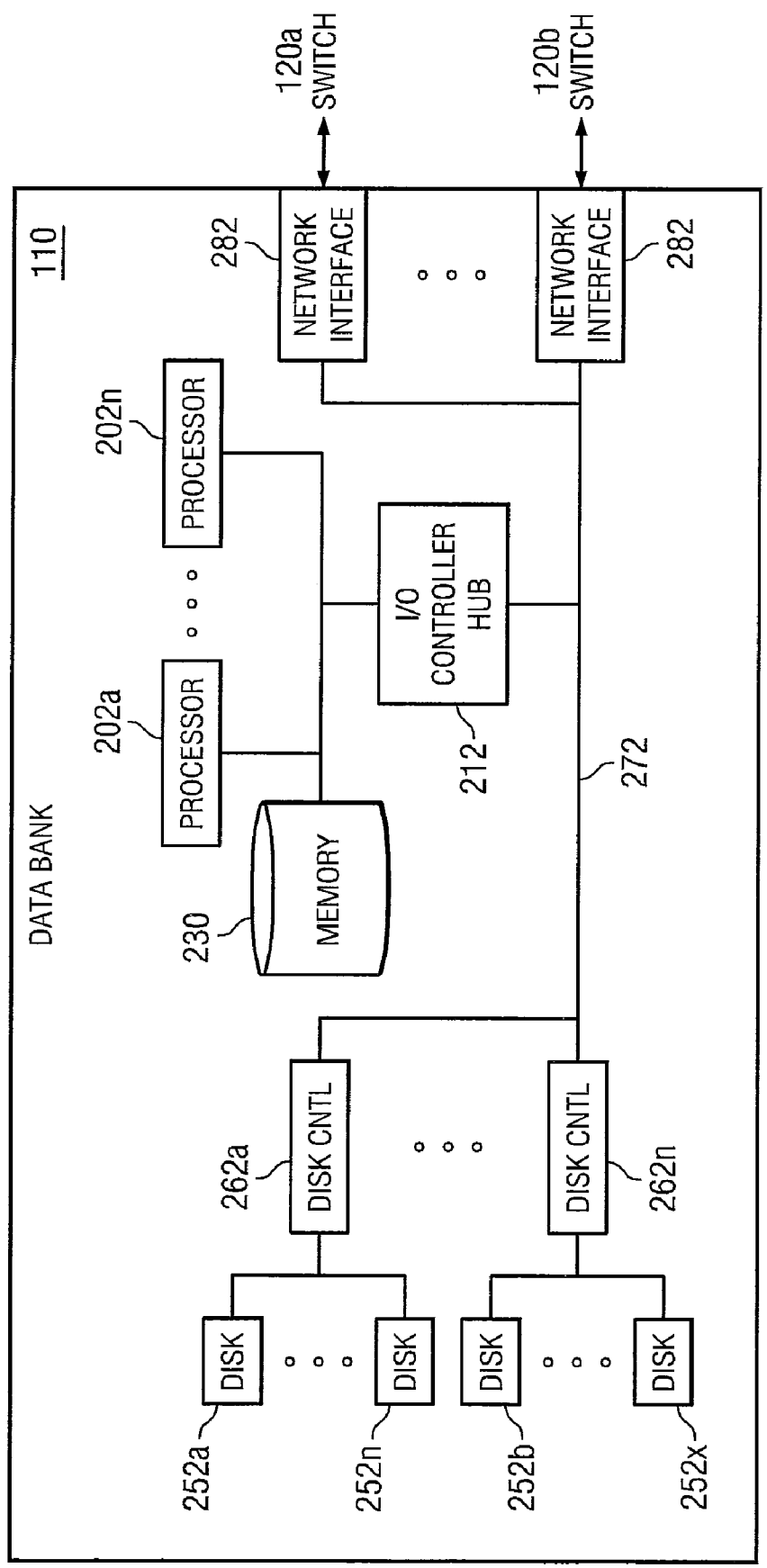
FIG. 2B is a block diagram of one embodiment of an architecture for a data bank.

FIG. 2B depicts a block diagram of one embodiment of a hardware architecture which may be used to implement data bank 110 computer operable to implement distributed RAID. In this architectural example, data bank 110 comprises one or more processors 202 which may adhere to the Intel x86 architecture or some other architecture altogether and a memory 230 coupled through a bus to I/O controller hub 212, which in one embodiment may be a southbridge chip or the like. The I/O controller hub 212 may, in turn, be coupled to and control a bus 272 such as a PCI-X bus, PCI-express bus, etc. Coupled to this bus 272 are one or more disk controllers 262 such as, for example, an LSI 1068 SATA/SAS controller. Each of these disk controllers 262 is coupled to one or more disks 252, where collectively these disks 252 may comprise data store 250. Additionally, one or more network interfaces 282 may also be coupled to bus 272. These network interfaces 282 may be network interfaces (such as Ethernet, etc.) which are included on motherboards, may comprise one or more network interface cards configured to interface via one or more protocols such as Ethernet, fibre channel, etc. or may be some other type of network interface such that data bank 110 may communicate with switched 120 through these network interfaces 282.

Figure 3:
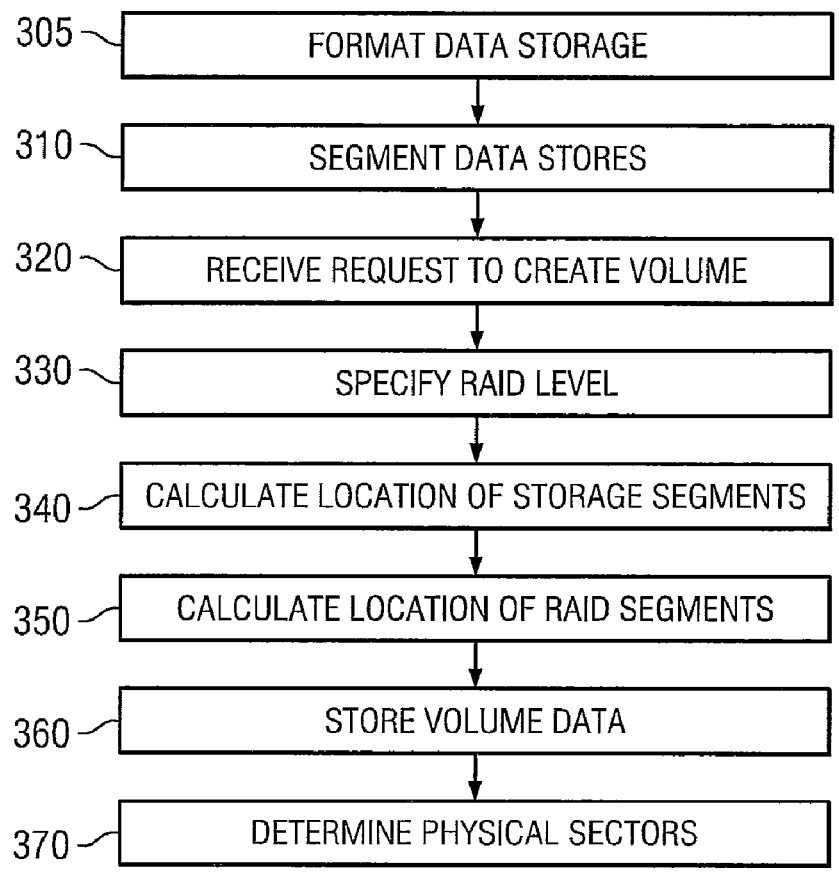
FIG. 3 is a flow diagram of one embodiment of a method implemented by a distributed RAID system.

Moving now to FIG. 3, one embodiment of a method for the allocation of volumes and the laying out of data associated with these volumes in data stores 250 across data banks 110 is illustrated. Initially, before volumes are to be allocated on a disk 252 of data store 250, the disk 252 may be formatted at step 305. As discussed above, in order to have the ability to easy and simply recover from any failures redundancy data may need to be accurate relative to any corresponding stored data. In many cases, this may entail that disks 252 utilized to store a volume be formatted by calculating redundancy data from the current data in the areas on disk 252 where portions of a volume are to be stored, even though data stored at these areas may currently be garbage values. These calculations may consume an undesirably large amount of time.

Furthermore, in a distributed RAID environment such as that detailed with respect to FIG. 1, other problems may present themselves. More specifically, as different portions of a volume may be stored on different data banks 110 and redundancy data corresponding to the volume may also be stored on various data banks 110, accomplishing this type of formatting may additionally require a great deal of communication between distributed RAID applications 210 on data banks 110, consuming processor cycles and communication bandwidth.

Thus, in one embodiment, to ensure that redundancy data corresponding to an area of a disk where data of a volume is to be stored is accurate relative to the area of disk 252 where that data of the volume is to be stored, a zero value may be written to the areas on disks 252 where data corresponding to the volume is to be stored and the areas on disk 252 where redundancy data is to be stored. By zeroing out both the areas of a disk 252 where data of a volume is to be stored and areas of disks 252 where redundancy data is to be stored it can be guaranteed that any data of the volume can be recreated from its corresponding redundancy data.

Zeroing disks 252 may have other advantages. Namely that no complex calculations may need to be performed to determine redundancy data and no communications between distributed RAID applications 210 may be to achieve relative accuracy between areas where a volume is to be stored and redundancy data corresponding to those areas.

Importantly, by zeroing out areas of disks 252 for use with a volume and its corresponding redundancy data a significant delay in the usability of RAID system 100 may be avoided. These advantages may be attained through the use of a process which substantially continuously during operation zeros out unallocated areas of disks 252 resulting, for example, from the initial use of distributed RAID system 100, the installation of new disks 252, the deletion of a volume, etc. In these instances, currently unallocated (i.e. not currently allocated) areas of disks 252 on each of data banks 110 may have zeros written to them (referred to as "zeroing" the area).

The unallocated areas of disks 252 which have been zeroed may be tracked such that when a command corresponding to a portion of a volume or redundancy data associated with a portion of a volume is received at a data bank 110 to which that portion is assigned, distributed RAID application 210 may check to determine if that portion has been assigned a corresponding area of disks 252 on data bank 110 where that portion has been assigned. If no corresponding area of disks 252 on data bank 110 has been assigned, distributed RAID application 210 may select an area of disks 252 which has been zeroed and assign this area of disks 252 to the portion of the volume or corresponding redundancy data.

By simultaneously zeroing out any unassigned areas which have not previously been zeroed and waiting until a command corresponding to a portion of a volume or redundancy data is received to assign a zeroed area of disks 252 to that portion distributed RAID system 100 may operate substantially immediately without a long involved formatting process and new disks 252 may be added and volumes deleted or freed relatively unobtrusively to the operation of distributed RAID system 100.

It will be noted, therefore, after reading the above that step 305 in which the disks 252 are formatted may be accomplished before, during or after the creation of a volume with respect to distributed RAID system 100 and that the placement of step 305 (and all other steps in all the flow diagrams herein) implies no order to the steps. As will also be noted after a thorough review of the rest of the steps in FIG. 3 and the remainder of the disclosure, a volume may be created and portions of the volume and redundancy data corresponding to the volume assigned to a data bank 110 before physical areas on disks 252 on these data banks 110 have been assigned to store the portions of the volume or redundancy data and that, furthermore, the zeroing of the physical areas on disks 252 used to store the data corresponding to such portions may occur before the creation of the volume or after the creation of the volume but before these physical areas are assigned to corresponding portions of the volume or redundancy data (as discussed in more detail later).

These locations may be better explained with reference to the concept of a segment which may be utilized by embodiments of a distributed RAID application 210, where a segment may be the size of 2048 logical block addresses (LBAs) (or some other size) and the size of the logical block address corresponds to the sector size of a disk 252. Disks 252 in the data store 250 on each of data banks 110 may therefore be separated into equal size segments (for example, 1 MB) at step 310. These segments may correspond to one or more contiguous data blocks of a disk drive 252. Therefore, when a user or host 102 requests the creation of a volume from distributed RAID application 210 at step 320 and specifies a level of RAID which will be used in conjunction with that volume at step 330, a number of these segments corresponding to the requested size of the volume plus the number of segments desired to implement the desired level of RAID in conjunction with the volume may be assigned to the volume at step 340.

Thus, the volume comprises a number of segments (also referred to as logical segments), where each of these segments may be associated with a particular data bank 110 such that the data bank 110 may be assigned to manage that segment of the volume. This segment may, for example, be the size of 2048 logical block addresses (LBAs), where the size of the logical block address corresponds to the size sector size of a disk 252 (other arrangements and sizes will also be possible).

In most cases the physical storage comprising that segment of the volume will be stored in the data store 250 of the data bank 110 which manages that segment, however, in other cases the data corresponding to that segment may be stored in the data store 205 of a different data bank 110 (in other words, in certain cases the data bank 110 comprising the distributed RAID application which manages that segment may be distinct from the data bank 110 comprising the data store 250 which stores the data corresponding to that segment).

In one embodiment, the allocation of segments to data banks 110 corresponding to a particular volume may be accomplished by determining a random permutation of the set of data banks 110 corresponding to the distributed RAID system 100. Thus, if there are six data banks a random permutation of size six, where the random permutation comprises each of the data banks may be determined such that the segments may assigned to each of the data banks consecutively in the order of the random permutation.

For example, suppose there are four data banks 110 in a distributed RAID system (call them data bank1, data bank2, etc.). A random permutation of data bank2, data bank4, data bank1 and data bank3 may be determined. In this case, the first segment corresponding to a volume is on data bank2, the second segment may be on data bank4, the third on data bank1, the fourth on data bank 3 and the fifth back again on data bank 4. In this way, the location of a particular segment corresponding with the volume may be determined mathematically if the random permutation corresponding to the volume is known.

As mentioned the user may specify that a level of RAID is to be implemented in conjunction with a volume at step 330. In this case, distributed RAID application 210 may ensure that any data corresponding to the implementation of RAID in conjunction with a volume is stored at an appropriate location at step 350 such that the RAID information is appropriately distributed across data banks 110 to ensure that the desired level of RAID is achieved.

For example, if it is desired to implement RAID 5 in conjunction with a volume, distributed RAID application 210 may determine a desired RAID parity group size (for example, based on a user configured RAID set or otherwise determined). This determination may be based on the number of data banks 110 in the distributed RAID system and may, in one embodiment, be one less than the number of data banks 110 (plus an additional one to account for the parity data).

To illustrate, if there were five data banks 110, for every four segments which store data associated with the volume (referred to as data segments), one segment would be dedicated to parity and the parity for the four segments calculated and stored in this parity segment, where the parity segment would be dedicated in a data bank 110 whose data store 250 does not comprise the data segments from which the parity data of the parity segment was calculated.

At this point, each segment corresponding to a logical volume has been assigned to a particular data bank 110 and any segments 100 to be utilized to store RAID data corresponding to the volume (referred to herein interchangeably as redundancy segments or parity segments, without loss of general applicability to the use of the segment to store any type of redundancy data associated with the implementation of any level of RAID in conjunction with a volume) have also been assigned to a data bank 110, however, physical sectors of the disks 252 of the data stores 250 of the data banks may not have yet been assigned to store the data corresponding to those segments. Thus, at step 360 physical segments of disks 252 on the data bank 110 to which a logical segment of the volume has been assigned may be determined and assigned to the logical segments. This segment mapping may be stored in the local tables 245 of each data bank 110. This assignment may, as mentioned earlier, take place at some later point, for example, when a command first attempts to write a logical segment.

When making this assignment, in one embodiment the areas different performance characteristics of disks 252 may be accounted for relative to the accessed logical segment. In other words, disks 252 may have segments which are more efficiently accessed than other segments of the same disk. Therefore, in one embodiment it may desirable to assign physical segments of a disk 252 based upon criteria associated with the logical segment. The characteristics may include for example, such things as a quality of service designation associated with a volume corresponding to the logical segment, a number of accesses to the volume comprising the logical segment, etc.

At step 370, then, information corresponding to the volume may be stored, such that the location of segments corresponding to the volume, or segment corresponding to the implementation of RAID in conjunction with the volume, may be determined from this stored information. This stored information (collectively referred to as mapping data) may therefore include an identification for the volume, the random permutation corresponding to the volume (for example, indicating the order of data banks 110 on which the segments are located) and the parity group size of any RAID implementation (for example, if the volume corresponds to a 4+1 RAID set, a 7+1 RAID set, if RAID 1 is implemented, etc.). This data may be stored, for example, in global tables 240 such that it can be communicated to other distributed RAID applications 210 on other data banks 110 to ensure that at least a portion of the set of tables 240 associated with each distributed RAID application 210 remains substantially consistent and the location.

Figure 4:
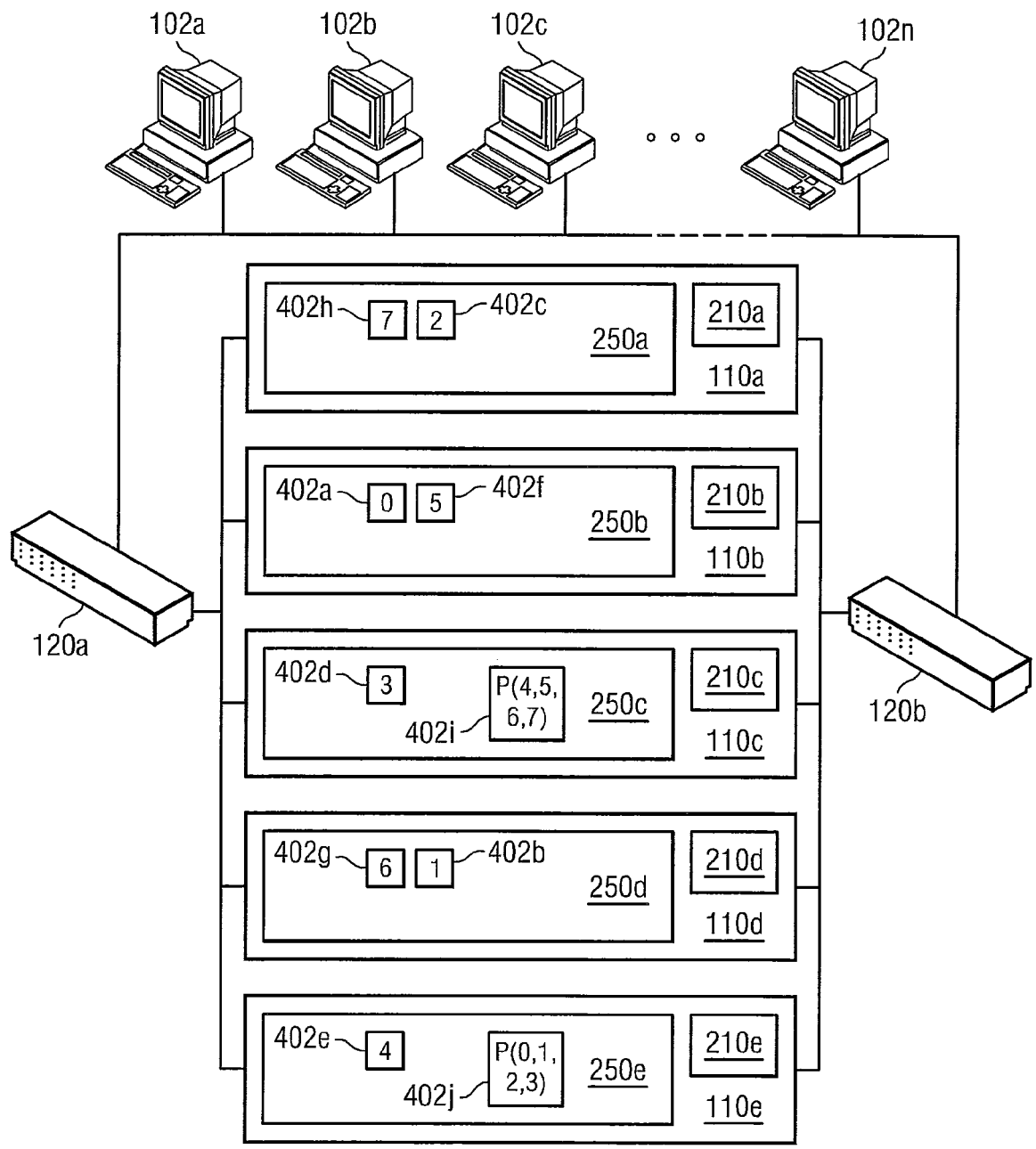
FIG. 4 is block diagram of an example of one embodiment of an architecture employing a distributed RAID system.

The above description may be better understood with reference to FIG. 4 which depicts one example of one embodiment of a distributed RAID system with five data banks 110. Here, each data store 250 of each data bank 110 has been laid out as a set of equally sized segments 402, which for purposes of this example will be assumed to be 1 MB in size. Suppose, now that a host 102 requests a volume of 8 MB with RAID level 5 from distributed RAID application 210b on data bank 110b. In this case, distributed RAID application 210b may determine that eight segments 402 are required for the data portion of the volume while two segments 402 segments may be required to store the redundancy data for the volume in conjunction with implementation of the desired RAID level for the volume. Distributed RAID application 210b may then determine a random permutation for the volume. For purposes of this example, assume that the random permutation is: data bank 110b, data bank 110d, data bank 110a, data bank 110c, and data bank 110e. Thus, data bank 110b may be assigned segment 402a, the first segment of the requested volume, data bank 110d may be assigned segment 402b, the second segment of the requested volume, data bank 110a may be assigned segment 402c, the third segment of the requested volume, data bank 110c may be assigned segment 402d, the fourth segment of the requested volume and data bank 110e may be assigned segment 402e, the fifth segment of the requested volume. The assignment then begins again with the first data bank 110 of the random order such that data bank 110b may be assigned segment 402f, the sixth segment of the requested volume, data bank 110d may be assigned segment 402g, the sixth segment of the requested volume and data bank 110a may be assigned segment 402h, the eighth segment of the requested volume.

Once the data segments 402a-402h for storing data associated with the volume have been assigned, distributed RAID application 210b may assign segments 402 for any data associated with the implementation of that RAID level. In this example, as RAID 5 is desired with respect to the volume, distributed RAID application 210b may determine that as five data banks 110 are being utilized a (4+1) parity set may be desired. Distributed RAID application 210b may then determine that to store the parity to implement RAID 5 in conjunction with eight segments 402 an additional two segments 402 may be needed.

Furthermore, it may be desired that the parity created utilizing a particular set of data segments 402 will not be stored on a data bank 110 having any of those set of data segments 402 in its data store. Thus, distributed RAID application 210b may also determine a location where each of the parity segments will be allocated based on the determined RAID parity group size, the location of the first data segment 402a, etc. Here, parity segment 402i which will store the parity data corresponding to the data stored in data segments 402a, 402b, 402c and 402d will be allocated in data store 250c of data bank 110c while parity segment 402j which will store the parity data corresponding to the data stored in data segments 402e, 402f, 402g and 402h will be allocated in data store 250e of data bank 110e. Notice here that the parity segments 402i, 402j which will store the parity information associated with the implementation of RAID in conjunction with the volume comprising data segments 402a-402h are laid out and sized substantially identically to as those segments 402a-402h which store the data associated with the volume.

Thus, when a host 102 accesses the volume, a request with a logical address corresponding to the first data segment of the volume may correspond to data segment 402a on data bank 110b, a request with a logical address corresponding to the second data segment of the volume may correspond to data segment 402b on data bank 110d, etc. Notice here, that the allocated data segments 402a-402h may reside on different data banks 110 and that the location of any allocated data segment 402a-402h may be determined using the random permutation associated with that volume (for example, as stored in global tables 240 at data banks 110). As discussed above, however, data stores 250 on data banks 110 have been virtualized, thus the requesting host may not be aware of the location of the data segments 402 in data stores 250, that multiple data stores 250 exist, that data stores 250 are spread across multiple data banks 110, etc. Host 102 believes it is addressing a single contiguous volume.

It will be apparent that the location of the data segments 402 on data banks 110 (and the corresponding random permutation of data banks 110) in this example is for purposes of illustration and that the data segments 402 of a volume may be located on any of data stores 250 on any of the data banks 110 according to almost any random, or other, permutation. Furthermore, it will be noted that while each of segments 402 is in this example 1 MB, these may be of any size without loss of generality and that a 1 MB size has been chosen solely for ease of illustration.

As can be seen from the above description then, the location of a particular data segment 402 or parity segment 402 can be determined algorithmically (for example, using the same random permutation used to assign segments for the volume, locate the parity segments for the volume, etc.) using the random permutation associated with the volume and the RAID parity group size. Thus, the information may be stored in conjunction with an identification corresponding to the volume, for example in set of global tables 240. Furthermore, these global tables 240 may be communicated between data banks 110, or otherwise updated, such that at least portions of the set of global tables 240 in each of the data banks 110 may be kept substantially consistent.

It may be helpful here to briefly delve into more detail regarding global tables 240 associated with distributed RAID application 210. As discussed, in one embodiment, global tables 240 may store information associated with volumes created by distributed RAID application 210 where those tables 240 can be used to determine a data bank 110 associated with a data segment within that volume or where a parity segment associated with a data segment corresponding to that volume is located. Global tables 240 may therefore comprise a set of tables, each table corresponding to a volume implemented with respect to databanks 110. In particular, one of these tables 240 may contain data which may be used to identify a data bank 110 whose data store 250 comprises a certain segment of a volume. Specifically, this table may be used to correlate a logical address associated with a volume with the data bank 110 where the segment (data, redundancy, etc.) corresponding to that logical address is stored.

FIG. 5 depicts a graphical representation of one embodiment of this type of table, where each volume may have an associated instance of such a table associated. Table 550 includes entries for LV number 504, segment size 508, segment count 512, quality of service (QOS) 514, range count 518, information for range entries, including in the embodiment depicted a first range 524a and a second range 524b and any additional range entries 524n.

LV number 504 is a unique number used to identify a particular volume, segment size 508 corresponds to the size of the segments used to implement the volume, segment count 512 corresponds to the number of segments corresponding to the logical volume (for example, both the number of data segments and redundancy segments, just the number of data segments, etc), QOS 514 indicates the quality of service which it is desired to implement with respect to the volume (note that this QOS indicator may indicate a priority to be given to that volume relative to other volumes stored on data banks 110) and range count 518 indicates a number of ranges associated with the volume, while range entries 524 each correspond to one of those ranges.

A range may correspond to a particular data bank 110 order and RAID implementation. Multiple ranges may be utilized to implement a volume for a variety of reasons. Specifically, for example, multiple ranges may be utilized in conjunction with a volume because different data stores 250 at different data banks 110 may have different amounts of storage in data store 250 available for use. This may lead to a situation where for example, for a first range of a volume all data banks 110 may be utilized in conjunction with a first RAID implementation while in a second range of a volume fewer than all the data banks 110 available may be utilized in conjunction with a second RAID implementation (where the first and second RAID implementations may, in fact, be different levels than one another). Each of these ranges may therefore correspond to segments laid out according to different data bank 110 orders (for example, random permutations, etc.), having a different number of data banks 110 available for use, a different type of RAID, etc.

To illustrate using a concrete example, brief reference is made back to FIG. 4. Suppose that the volume of 8 MB with RAID level 5 is laid out as shown, where the data segments are laid out according to the order data bank 110b, data bank 110d, data bank 110a, data bank 110c, and data bank 110e and RAID 5 is implemented in conjunction with the volume utilizing a (4+1) parity set may be desired with the parity segments assigned in data store 250c of data bank 110c and data store 250e of data bank 110e.

Now suppose that it is requested to add an additional 3 MB to this volume. However, suppose in this instance that data stores 250 of data banks 110e, 110c and 110d have no more room. Thus, in this case the only solution may be to allocate the additional desired 3 MB between data banks 110a and 110b which have remaining storage in data stores 250. Furthermore, as only two data banks 110 may be available for use it may only be possible to utilize a RAID level of 1 instead of RAID 5 as utilized with the first 8 MB of the volume. Thus, in this case the first 8 MB of the volume may correspond to a first range, and have a first range entry in a table corresponding to the volume with a first set of values while the next 3 MB of the volume may correspond to a second range, and have a second range entry in a table corresponding to the volume with a second set of values. As may be apparent after reading this disclosure, this type of occurrence may occur with some frequency.

Returning to FIG. 5, to deal with these types of situations, among others, each range of a volume may have an entry in a table 550 such that the location of segments in that particular range may be determined from the range entry corresponding to that range. Entries 524 for each of the ranges of the volume corresponding to the table 550 are associated with range count 518. In one embodiment, range count 518 may correspond to the number of ranges of a volume such that the number of range entries 524 corresponds to the range count 518. While only range entries 524a and 524b are shown it will be noted that the number of range entries 524 in a table will depend on the number of ranges corresponding to the volume to which that table corresponds. Thus, if a volume is divided into three ranges, there will be three range entries 524 in table 550 such that there is a range entry 524 comprising information for each range of the volume corresponding to table 550.

Information for a range entry 524 includes type 526, start 530, end 534, network RAID 538, network RAID size 542, disk RAID 546, disk RAID size 550, databank count 554, databank order 558 and a disk count 562 and disk order 566 corresponding to each data bank 110 used to store segments associated with range 524 (in other words there will be a disk count 562 and disk order 566 equal to databank count 554 of that range entry 524). Type 526 describes the type of the range corresponding to information for range entry 524: for example, normal, source (SRC), destination (DST) or other type of range. Start 230 is the first logical segment address of the range of the volume corresponding to range entry 524. End 234 is the last logical segment address of the range corresponding to information for the range of the volume corresponding to range entry 524. Other arrangements are also possible, for example, end 524 may be a count which is the maximum number of segments or blocks in the range, etc.

Databank count 554 may correspond to the number of data banks 110 on which the range corresponding to the range entry resides, databank order 558 may be the order in which segments in that range were assigned to data banks 110 while network RAID 538, network RAID size 542, disk RAID 546 and disk RAID size 552 may correspond to the type of RAID implemented in conjunction with the range of the volume corresponding to range entry 524.

Network RAID 538 is the type of RAID being implemented in association with the volume corresponding to the table 550, for example, RAID 0, RAID 1 or RAID 5 or other RAID types. Network RAID Size 542 is the parity group size of the RAID type used in the range. The Network RAID Size 542 may be limited by the number of data banks 110 in the range to be less than or equal to the number of databanks in the range corresponding to information for range 524. Disk RAID 546 is the type of RAID being implemented across disks in the databanks in the range. Disk RAID size 552 may be the parity group size of the RAID type used across the disks 252 in the data store 250 of each data bank 110 and may be limited to be less than or equal to the number of disks in the databank. In embodiments, RAID across the disks in the databanks 110 in the range is optional and may or may not be used. In such embodiments, either Disk RAID 546, Disk RAID Size 552 or both may not be used or may be omitted.

Data bank count 554 is the number of databanks in the range and Databank order 558 is the order in which RAID is implemented (for example, striped) across the data banks 110 in the range. For example, data banks 110 may have data corresponding to the logical addresses of the volume saved in a certain order and databank order 558 corresponds to this order. Disk count 562 is the number of disks within a data bank 110 of the range and disk order 566 is the order in which RAID is implemented across disks of a particular databank 110. For example, disks 252 may have segments saved to them in a certain order and disk order 566 is the order in which segments are stored across disks 252 in a data bank 110. Thus, for each databank 110 used to store segments of the range associated with the range entry 524 there will be a corresponding disk count 562 and disk order 566 (in other words the number of disk counts 562 and disk orders 566 will, in one embodiment, be equal to databank count 554 of that range entry 524). In embodiments, RAID across disks 252 in the data banks 110 is optional and may not be used. It will be noted that while table 550 has been described with specificity, this description is by way of example, not limitation and other forms of table 550 may be utilized. For example, a virtual table may be used instead of table 550 and may explicitly list the segment 402 and data bank 110 corresponding to each logical address.

Thus, as discussed earlier, information in table 550 may be used to identify a data bank 110 comprising a data segment 402 corresponding to a logical address (referenced by a host 102 in a command or in any other context). For example, knowing the size of segments 402 and using start 530, end 534, the range entry 524 corresponding to the address, etc., the particular data bank 110 corresponding to a logical address of the volume can be determined.

While one or more portions of tables 240 may be substantially identical across all data banks 110 and may describe one or more logical volumes which span one or more data banks 110 as described above, other tables 245 on a data bank 110 may be distinct to the data bank 110 to which it corresponds (for instance, table 245 may be unique to the data bank 110 on which the corresponding distributed RAID application 210 is executing). This table 245 may comprise data pertaining to each disk 252 contained in the data store 250 of the corresponding data bank 110 and may comprise information on where information is stored on or among disks 252 of the data store, for example, the sector of a disk 252 where a segment 402 assigned to the data bank 110 is located in data store 250.

Figure 6:
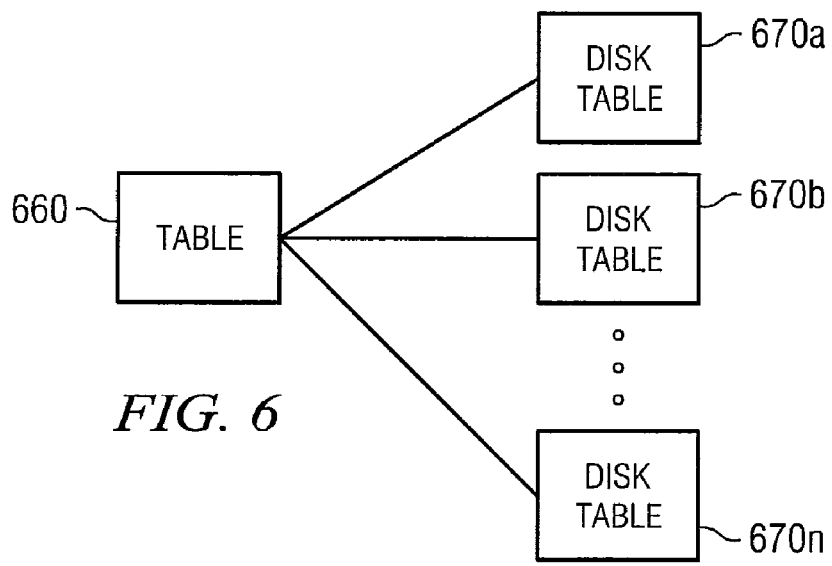
FIG. 6 is a block diagram of one embodiment of a table.

In FIG. 6 a graphical representation of one embodiment of this type of table is depicted. Table 660 may be stored at a particular data bank 110 and comprise multiple disk tables 670, each of the disk tables 670 corresponding to a disk 252 of the data store 250 within that data bank 110 and listing the location of the segments stored within that disk 252. More specifically, in most cases disks 252 are divided into physical sectors, each physical sector having a corresponding address or range of addresses.

A disk table 670 may be a mapping table which can be utilized to determine the location of a sector of a disk 252 of the data bank 110 where a segment of a volume is stored. Thus, using a table 670 the address of a sector on a disk 252 corresponding to a segment of a volume can be determined. Furthermore, the table may contain one or more flags or descriptive bits per entry corresponding to a segment or sector of the disk, describing the sector or segment stored at that sector.

Referring now to FIG. 7, a graphical representation of one embodiment of a disk table 670 is depicted. Disk table 670 has multiple entries, each entry corresponding to a physical segment of the corresponding disk such that the entries of disk table 670 describe the physical segments of the disk 252. Each entry in disk table 670 may also include one or more flags or bit fields describing the physical segment or segment of the volume stored at the corresponding sector. More particularly, as shown in FIG. 7, in one embodiment entries in disk table 670 include fields for a logical volume (LV) number, logical segment number, address space and sector state. LV number identifies the logical volume to which data stored at that physical segment corresponds. Logical segment number identifies the segment of the logical volume corresponding to that data. Address space identifies the segment stored as 'data' or 'redundancy'. A value of 'data' may indicates that data is stored at the sector represented by the entry, whereas a value of 'redundancy' indicates that the information stored at the sector may be used for RAID data protection and, depending upon the RAID level, may be redundant data, mirrored data or parity information. Sector state indicates the state of the segment as being 'allocated', 'zeroed' or 'dirty'. 'Allocated' indicates the segment has been allocated and may comprise valid data. 'Zeroed' indicates the segment has been zeroed out by writing zeros to the segment and 'dirty' indicates the segment may comprise garbage are otherwise unusable or undesirable values, for example because the segment has not been zeroed out or allocated, may be storing random bits or data. In one embodiment, for example, for a new disk all segments of the disk may be marked as dirty in a disk table corresponding to the new or newly added disk.

It may be useful here to detail embodiments of zeroing out disks 252 utilized in data banks 110 in more detail in conjunction with embodiments of such disk tables. As discussed above, for a variety of reasons it may be desired to zero segments of disks 252 at a variety of points (for example, when distributed RAID system 100 is initially used, when a new disk 252 is installed in data store 250, when a volume is moved or deleted, when a portion of a volume is freed, when data banks 110 are added to the system or in a wide variety of other circumstances).

To accomplish this zeroing process, in one embodiment distributed RAID application 210 may employ a background process which locates unallocated segments and zeros these unallocated segments if needed. By the same token, distributed RAID application 210 may receive commands corresponding to a segment of a volume or a segment corresponding to redundancy data of a volume and assign unallocated segments of disk 252 (for example, physical segments) to corresponding segments of a volume or a segment of redundancy data (for example, logical segments).

Figure 8A:
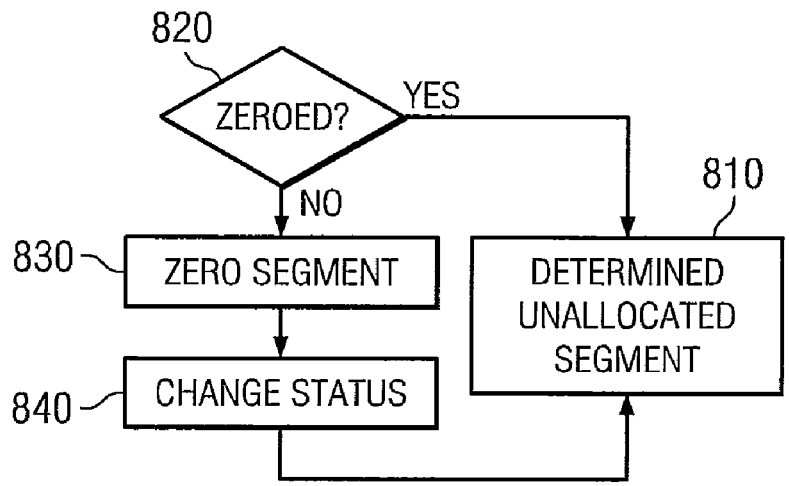
FIG. 8A is a flow diagram of one embodiment of a method of zeroing segments.
Figure 8B:
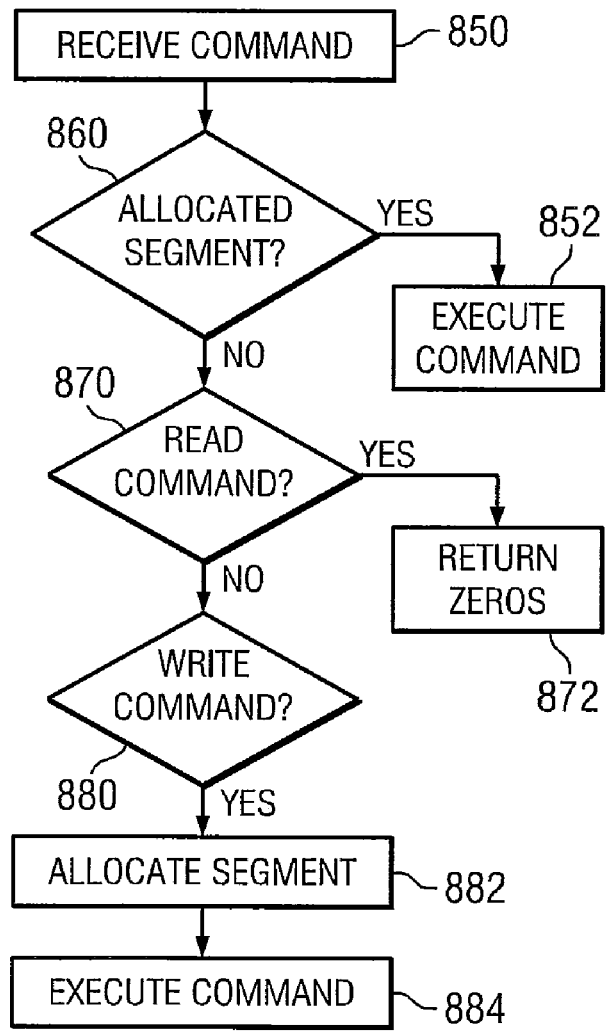
FIG. 8B is a flow diagram of one embodiment of a method of allocating segments.

Types of these methods employed by distributed RAID application 210 may be better understood with reference to FIG. 8A which depicts one embodiment a method for zeroing segments of disks 252 at a data bank 110 and FIG. 8B which depicts one embodiment of a method for allocating segments of those disks 252. Starting with FIG. 8A, a process employed by distributed RAID application may, substantially continually (for example, using what is commonly known as a background process), or at some designated interval determine an unallocated sector at step 810. This determination may be accomplished by scanning the sector state field of disk tables 670 corresponding to disks 252 of a data bank 110. An entry in the disk table with the sector state field having a value of "dirty" may be selected. It will be noted that there may be many entries with the value of "dirty" in the sector state field and a variety of algorithms may be employed to prioritize which of these entries gets selected, including algorithms which prioritize based on the disk 252 to which the entry corresponds, the location on the disk 252 of the physical segment corresponding to the entry, etc.

Once an unallocated segment is determined at step 810 it can be determined at step 820 if the segment has already been zeroed. If so, another allocated segment may be determined at step 810. If, however, the segment has not been zeroed, the segment may be zeroed at step 830 by writing zero values to the segment. The state of the segment may then be changed at step 840 by, in one embodiment, changing the value of the sector state field of the entry in the disk table 670 corresponding to the segment from "dirty" to "zeroed". Thus, in one embodiment zeroing of "dirty" segments may be accomplished by a background process that occurs while the distributed RAID system 100 is operable for use by one or more hosts 102.

Moving on to FIG. 8B, a flow diagram of one embodiment of a method of the allocation of segments by distributed RAID application is depicted. At step 850 a command corresponding to a logical segment associated with a volume or redundancy data for a volume (for example, a parity segment) may be received. It can then be determined if the command corresponds to an allocated segment of disks 252 of the data bank 110 at step 860. This determination may be made utilizing disk tables 670 which comprise data regarding mapping of logical segments to physical segments of disks 252. If a physical segment of disks 252 has previously been allocated to the logical segment corresponding to the command, the command may be executed utilizing that physical segment at step 862.

Otherwise (no physical segment of disks 252 has been allocated to the logical segment corresponding to the command), at step 870 it can be determined if the command is a READ command. If the command is a READ command all zeros may be returned in response to the command at step 872. Note then, that in one embodiment a sector state having a value of "dirty" are treated as a virtual zero which may comprise treating the bits in the sector as having a value of zero (though the segments may not have actually been zeroed).

If the command is not a READ command, it may be determined if the command is a WRITE command at step 880. If so, at step 882 a physical segment of disks 252 may be allocated to the logical segment. This allocation may be accomplished by determining a physical segment of disk 252 which is both unallocated and zeroed by processing disk tables 670 to determine an entry where the value of the sector state entry is "zeroed". The physical segment may then be allocated to the logical segment corresponding to the received WRITE command by updating the values of the entry in disk tables 670 corresponding to the physical segment being assigned, including updating the sector state value of the entry to "allocated". The WRITE command may then be executed using the allocated physical segment at step 884. It will be apparent that almost any algorithm may be utilized to select which physical segment gets allocated to a particular logical segment, including algorithms which prioritize the allocation of physical segments based upon the location of the physical segment on a disk 252, a QOS indicator associated with a volume, the number of access to a particular segment, etc.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system, comprising:
   a storage appliance, including:
   a processor;
   a data store; and
   a computer readable medium comprising instructions executable for:
   determining that a set of physical segments of the data store are unallocated;
   for each of the determined set of unallocated physical segments, determining if the unallocated physical segment has been zeroed and, if the unallocated physical segment has not be zeroed, zeroing the unallocated physical segment;
   receiving a command corresponding to a first logical segment of a volume;
   determining if any physical segment of the data store has been allocated to the first logical segment; and
   if no physical segment has been allocated to the first logical segment, determining a first physical segment of the data store that is both unallocated and zeroed and allocating the first physical segment to the first logical segment.

2. The system of claim 1, wherein the storage appliance is one of a plurality of storage appliances operable to store the volume on each of the plurality of storage appliances in conjunction with a Redundant Array of Independent Disks (RAID) level, such that for a data segment corresponding to the volume one or more corresponding redundancy segments comprising redundancy data associated with the data segment does not reside on the same storage appliance as the data segment.

3. The system of claim 2, wherein the volume comprises a set of logical segments including the first logical segment, and the set of logical segments of the volume are stored on the plurality of storage appliances according to a storage appliance order, where the storage appliance order is an ordering of the plurality of storage appliances including each of the plurality of storage appliances exactly once.

4. The system of claim 2, wherein determining the first physical segment of the data store to allocate to the first logical segment is based upon a performance characteristic of the first physical segment or one or more criteria associated with the first logical segment.

5. The system of claim 2, wherein the instructions are further executable for receiving the command corresponding to the first logical segment of the volume from a first host, determining a first storage appliance of the plurality of storage appliances, wherein the first storage appliance corresponds to the first logical segment; and if the first storage appliance is the storage appliance which received the command executing the command with respect to the first logical segment and if not, forwarding the command to the first storage appliance.

6. The system of claim 5, wherein the instructions are further executable for determining if the command is a write command and if the command is a write command determining a second storage appliance of the plurality of storage appliances, wherein the second storage appliance corresponds to a first redundancy segment associated with the first logical segment and if the second storage appliance is the storage appliance which received the command execute the command with respect to the first redundancy segment and if not, forward the command to the second storage appliance.

7. The system of claim 1, wherein determining if any physical segment of the data store has been allocated and determining the first physical segment of the data store that is unallocated and zeroed are accomplished using a disk table and the instructions are further executable for updating the disk table when one of the physical segments of the data store is zeroed or when one of the physical segments of the data store is allocated.

8. A method for initializing storage in a storage appliance having a processor, the method comprising:
  determining that a set of physical segments of a data store are unallocated;
  for each of the determined set of unallocated physical segments, determining if the unallocated physical segment has been zeroed and, if the unallocated physical segment has not be zeroed, zeroing the unallocated physical segment;
  receiving a command corresponding to a first logical segment of a volume;
  determining if any physical segment of the data store has been allocated to the first logical segment; and
  if no physical segment has been allocated to the first logical segment, determining a first physical segment of the data store that is both unallocated and zeroed and allocating the first physical segment to the first logical segment.

9. The method of claim 8, wherein the storage appliance is one of a plurality of storage appliances operable to store the volume on each of the plurality of storage appliances in conjunction with a Redundant Array of Independent Disks (RAID) level, such that for a data segment corresponding to the volume one or more corresponding redundancy segments comprising redundancy data associated with the data segment does not reside on the same storage appliance as the data segment.

10. The method of claim 9, wherein the volume comprises a set of logical segments including the first logical segment, and the set of logical segments of the volume are stored on the plurality of storage appliances according to a storage appliance order, where the storage appliance order is an ordering of the plurality of storage appliances including each of the plurality of storage appliances exactly once.

11. The method of claim 9, wherein determining the first physical segment of the data store to allocate to the first logical segment is based upon a performance characteristic of the first physical segment or one or more criteria associated with the first logical segment.

12. The method of claim 9, further comprising receiving the command corresponding to the first logical segment of the volume from a first host, determining a first storage appliance of the plurality of storage appliances, wherein the first storage appliance corresponds to the first logical segment; and if the first storage appliance is a storage appliance which received the command executing the command with respect to the first logical segment and if not, forwarding the command to the first storage appliance.

13. The method of claim 12, further comprising determining if the command is a write command and if the command is a write command determining a second storage appliance of the plurality of storage appliances, wherein the second storage appliance corresponds to a first redundancy segment associated with the first logical segment and if the second storage appliance is the storage appliance which received the command execute the command with respect to the first redundancy segment and if not, forward the command to the second storage appliance.

14. The method of claim 8, wherein determining if any physical segment of the data store has been allocated and determining the first physical segment of the data store that is unallocated and zeroed are accomplished using a disk table and the method further comprises updating the disk table when one of the physical segments of the data store is zeroed or when one of the physical segments of the data store is allocated.

15. A computer readable medium for initializing storage in a storage appliance, the computer readable medium comprising instructions executable for:
  determining that a set of physical segments of a data store are unallocated;
  for each of the determined set of unallocated physical segments, determining if the unallocated physical segment has been zeroed and, if the unallocated physical segment has not be zeroed, zeroing the unallocated physical segment;
  receiving a command corresponding to a first logical segment of a volume;
  determining if any physical segment of the data store has been allocated to the first logical segment; and
  if no physical segment has been allocated to the first logical segment, determining a first physical segment of the data store that is both unallocated and zeroed and allocating the first physical segment to the first logical segment.

16. The computer readable medium of claim 15, wherein the storage appliance is one of a plurality of storage appliances operable to store the volume on each of the plurality of storage appliance in conjunction with a Redundant Array of Independent Disks (RAID) level, such that for a data segment corresponding to the volume one or more corresponding redundancy segments comprising redundancy data associated with the data segment does not reside on the same storage appliance as the data segment.

17. The computer readable medium of claim 16, wherein the volume comprises a set of logical segments including the first logical segment, and the set of logical segments of the volume are stored on the plurality of storage appliances according to a storage appliance order, where the storage appliance order is an ordering of the plurality of storage appliances including each of the plurality of storage appliances exactly once.

18. The computer readable medium of claim 16, wherein determining the first physical segment of the data store to allocate to the first logical segment is based upon a performance characteristic of the first physical segment or one or more criteria associated with the first logical segment.

19. The computer readable medium of claim 16, wherein the instructions are further executable for receiving the command corresponding to the first logical segment of the volume from a first host, determining a first storage appliance of the plurality of storage appliances, wherein the first storage appliance corresponds to the first logical segment; and if the first storage appliance is a storage appliance which received the command execute the command with respect to the first logical segment and if not, forward the command to the first storage appliance.

20. The computer readable medium of claim 19, wherein the instructions are further executable for determining if the command is a write command and if the command is a write command determining a second storage appliance of the plurality of storage appliances, wherein the second storage appliance corresponds to a first redundancy segment associated with the first logical segment and if the second storage appliance is the storage appliance which received the command execute the command with respect to the first redundancy segment and if not, forward the command to the second storage appliance.

21. The computer readable medium of claim 15, wherein determining if any physical segment of the data store has been allocated and determining the first physical segment of the data store that is unallocated and zeroed are accomplished using a disk table and the instructions are further executable for updating the disk table when one of the physical segments of the data store is zeroed or when one of the physical segments of the data store is allocated.

* * * * *